March 13, 1945.
R. H. GOLD ET AL
2,371,514
ROTARY ENGINE
Filed May 24, 1941
3 Sheets-Sheet 1
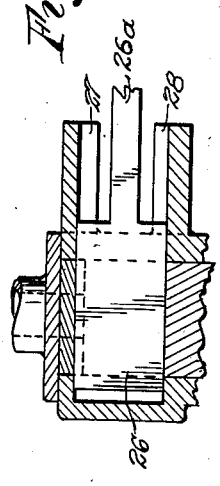
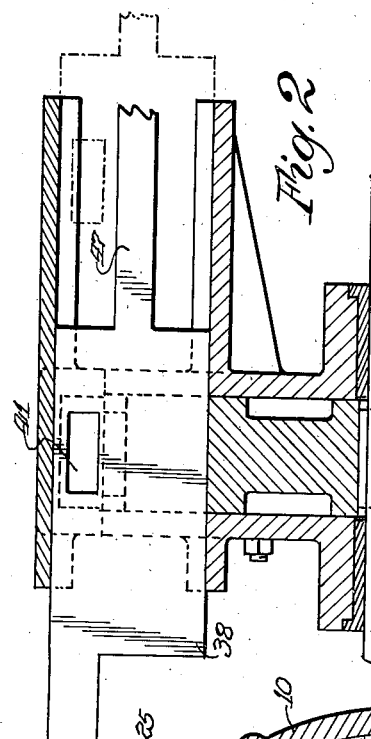
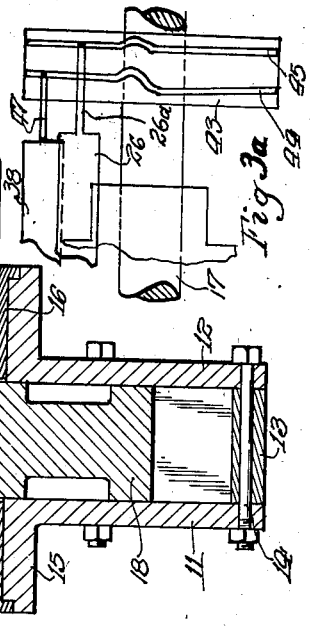
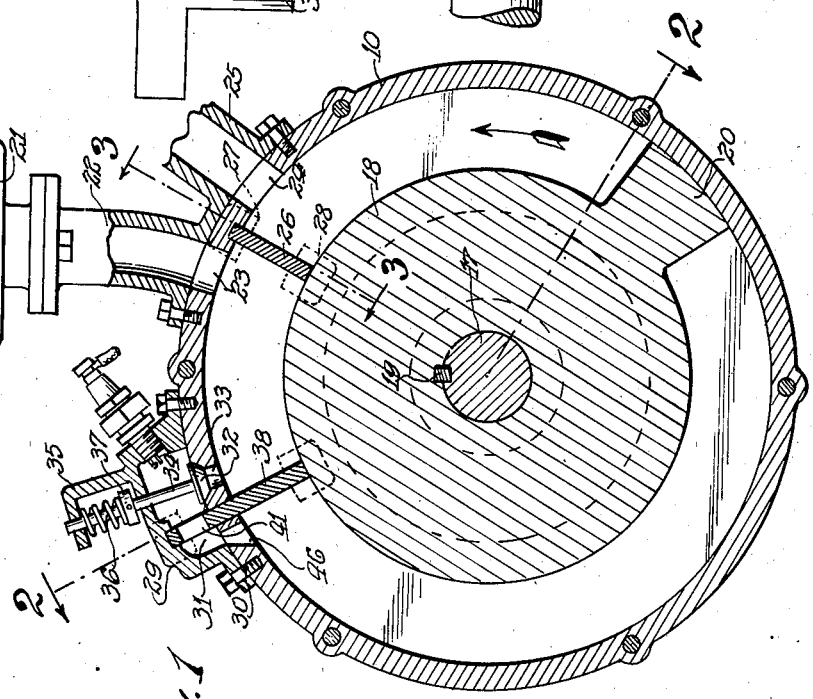
Inventors
RAYMOND H. GOLD
SIDNEY WASSERMAN March 13, 1945.  R. H. GOLD ET AL  2,371,514
ROTARY ENGINE
Filed May 24, 1941  3 Sheets-Sheet 2
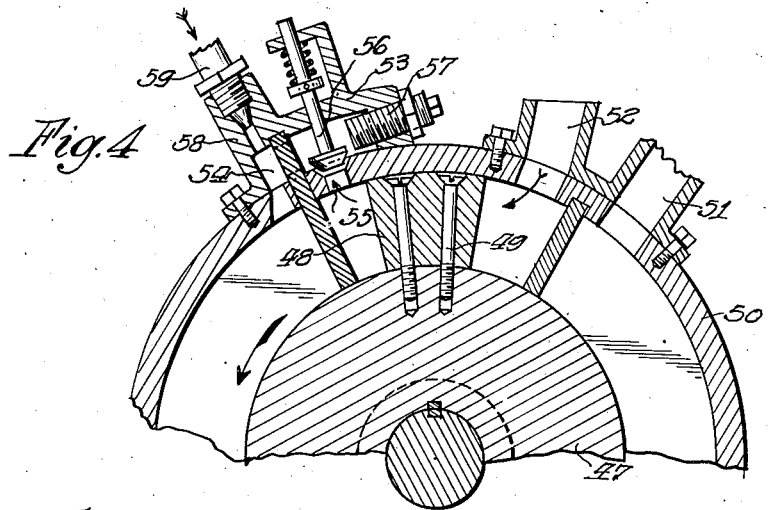
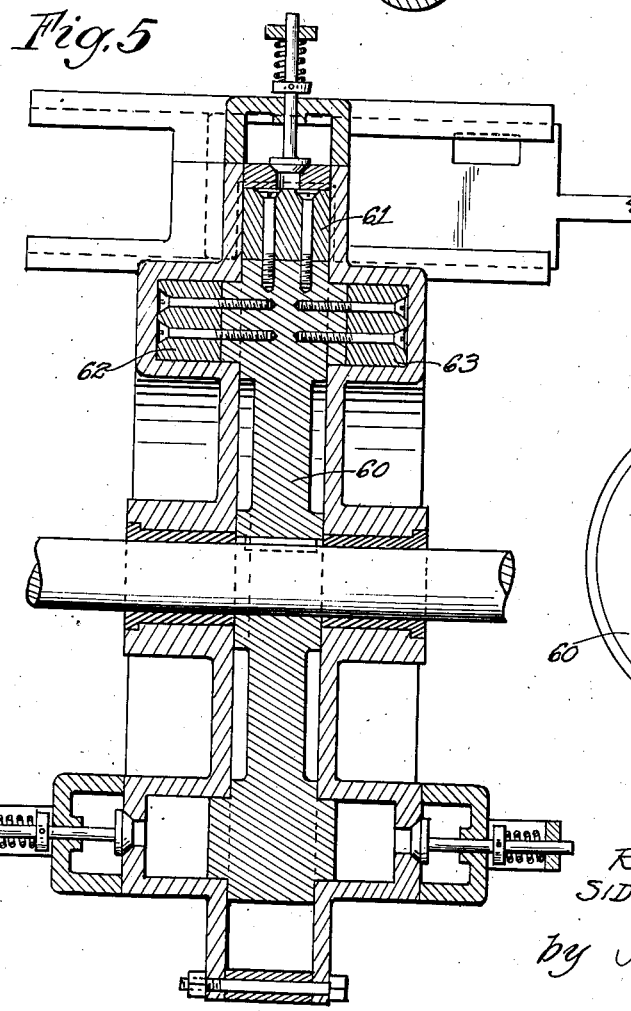
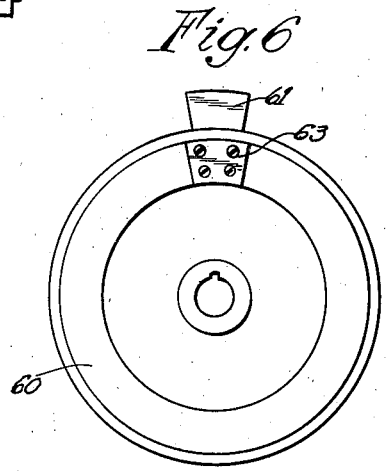
Inventors
RAMOND H. GOLD
SIDNEY WASSERMAN
by Henry Hech
Attorney.

March 13, 1945.　　　R. H. GOLD ET AL　　　2,371,514
ROTARY ENGINE
Filed May 24, 1941　　　3 Sheets-Sheet 3

Inventors
Raymond H. Gold
Sidney Wasserman
by Henry Heck
Attorney.

Patented Mar. 13, 1945

2,371,514

UNITED STATES PATENT OFFICE 2,371,514

ROTARY ENGINE

Raymond H. Gold and Sidney Wasserman, Chicago, Ill., assignors of one-third to Jacob Chaplick, Chicago, Ill.

Application May 24, 1941, Serial No. 394,970

3 Claims. (Cl. 123—14)

The invention relates to rotary internal combustion engines.

It is an object of the invention to provide a rotary engine wherein the gas is fully expanded in the engine and exhausted at atmospheric pressure.

A further object embraces the provision of a compression chamber whose cubic content may be altered to provide variable compression.

A still further object constitutes the provision of a rotary engine obviating the employment of a water pump or oil pump or a fan and requiring practically no cooling.

It is a further object to provide a rotary engine which is of extremely simple construction, having very few parts and yet is highly efficient.

It is another object to provide a rotary engine capable of being operated in the manner of a compression-ignition engine where fuel under normal pressure is injected into the combustion chamber.

It is also an object of the invention to provide certain features of construction and arrangement of parts tending to enhance the utility and efficiency of a rotary engine.

With these and many other objects in view, which will become apparent from a perusal of the invention, the latter comprises the means described in the following specification, particularly pointed out in the claims forming a part thereof, and illustrated in the accompanying drawings, in which:

Fig. 1 is a longitudinal section through a rotary engine constructed in accordance with our invention, Fig. 2 is a section on the line 2—2 of Fig. 1, showing the parts in firing position, Fig. 3 is a detail section on the line 3—3 of Fig. 1, Fig. 3a is a diagrammatic view showing the actuating means for the gate valves, Fig. 4 is a partial longitudinal section through a modified rotary engine operable as a compression-ignition engine, Fig. 5 is a cross section through a further modification employing three pistons, and Fig. 6 is a side view of the rotor and pistons.

Figure 7:
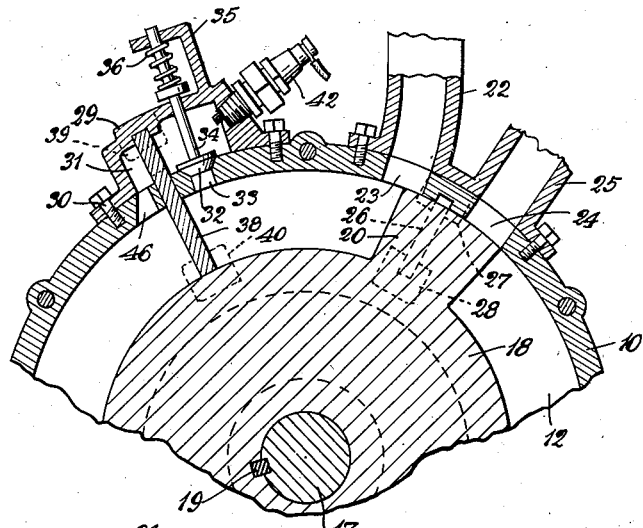
Figs. 7, 8 are fragmentary sections similar to Fig. 1 showing parts in different positions.
Figure 8:
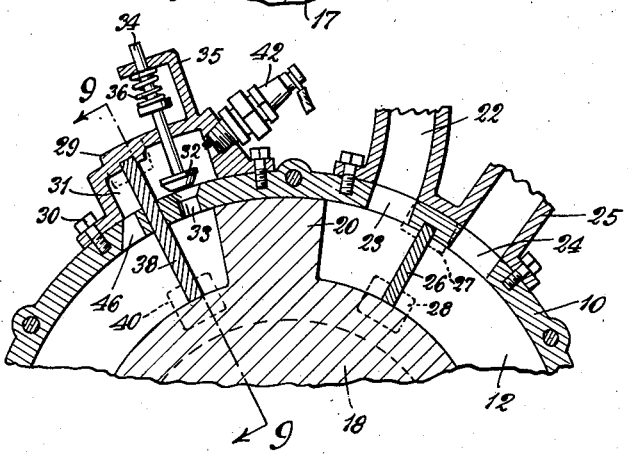
Figure 9:
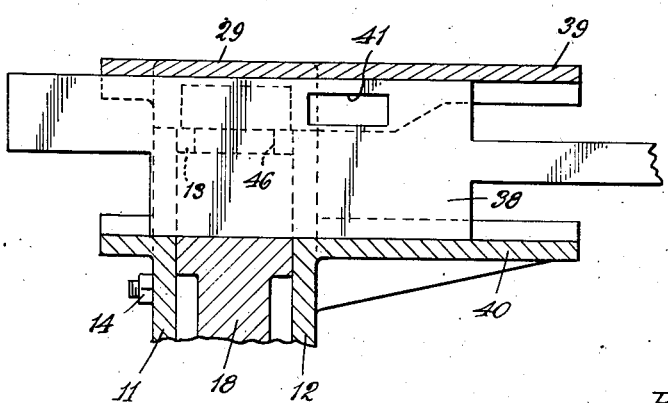
Fig. 9 is a fragmentary section similar to Fig. 2 with one of the abutments in normal position.

The invention embodies a rotary engine wherein a rotor is provided with a single piston.

Referring to the several views in the drawings, 10 designates a cylinder comprising side walls 11 and 12 separated by spacer sleeves 13, through which extends a bolt 14 for holding the walls together.

The side walls are each formed with an integral hub 15 provided with a bearing sleeve 16 in which is journaled a shaft 17 surrounded by a rotor 18 secured to the shaft by a spline 19.

The rotor is of smaller diameter than the cylinder and is provided with a single piston 20. A carbureter 21 is connected to a pipe 22 adapted to discharge gasified fuel into the cylinder through a port 23. Another port 24 permits exhaust through a pipe 25.

A sliding abutment 26 is mounted for lateral reciprocation between the pipes 22 and 25, through the cylinder in guides 27 and 28.

A small casing 29 is secured to the cylinder by bolts 30 adjacent to the discharge end of the carbureter. The casing encloses a chamber 31 in which a check valve 32 controls a port 33 and protrudes with the stem 34 which enters an aperture in a bracket 35. A spring 36 is interposed between the bracket and a collar 37 secured to the valve stem.

A sliding abutment 38 is provided which extends from the rotor through the cylinder adjacent to the check valve and enters guides 39 at the upper edge and guides 40 at the lower edge. The sliding abutment 38 is provided with an aperture 41 for a purpose hereinafter described. A spark plug 42 is mounted on the casing to ignite the compressed charge in the explosion chamber 31.

As indicated diagrammatically in Fig. 3a, a roller 43 is secured to the shaft 17. The roller is formed with two cam grooves 44 and 45. The sliding abutment 26 has a stem 26a which enters, with a bent end, the groove 45, whereas the stem 47 on the sliding abutment 38 enters the groove 44.

The operation of the engine is as follows:

The rotor 18 rotates in counter-clockwise direction together with its piston 20, expelling the air as it approaches the gate valve 26 through the exhaust 25.

The rotation of the roller 43 causes the gate valve 26 to open to permit passing of the piston and closes the valve immediately behind the piston.

In the subsequent rotation, the piston creates a vacuum behind it, causing a charge to be drawn in from the carbureter and simultaneously compresses a previously drawn-in charge into the chamber 31 through port 33 and check valve 32.

The sliding abutment 38 normally shuts off communication between the major portion of the chamber 31 and a port 46 through which the ignited gases are admitted to the cylinder, at which time the opening 41 occupies the dash and dotted position shown in Fig. 2. The sliding abutment 38 has three positions being:

1. Normally closing cylinder chamber and combustion chambers,
2. Opening cylinder chamber but keeping combustion chamber shut off from cylinder chamber,
3. Keeping cylinder chamber closed but opening port 46 to establish communication between combustion and cylinder chamber.

The sliding abutment 38 is withdrawn to clear the piston, is then returned to normal position, and thereupon is moved further to the left, as viewed in Fig. 2, to bring the gate valve opening 41 in the position shown in Figs. 1 and 2 so that the explosive charge passes through the openings 41 and 46 into the cylinder. Thereupon the sliding abutment 38 is returned to normal position.

The power stroke of the piston extends over approximately 90% of the entire revolution so that the explosive charge undergoes a maximum expansion.

The piston, while executing the power stroke, simultaneously expels through the exhaust pipe the previously spent gases.

It is evident that the rotary engine has an unusually long power stroke and hence affords great efficiency.

There are no reciprocating parts with the exception of the sliding abutments, and practically no cooling is necessary, thus dispensing with an oil pump, water pump, and a fan.

The explosion chamber being located on the outside of the casing cooling occurs without additional means being provided therefor.

The construction of the engine is extremely simple, insuring continuity of operation without any breakdowns.

In the modification shown in Fig. 4, a rotary engine is shown where fuel is injected under atmospheric pressure. Here the rotor 47 has a piston 48 secured thereto by screws 49. The cylinder 50 has an exhaust 51 and an air inlet 52. A casing 53 is secured to the cylinder and provides an explosion chamber 54. A port 55 in the cylinder is controlled by a check valve 56.

A threaded stud 57 enters an aperture in the casing 53 and may be adjusted to vary the content of the chamber 54 and thereby the compression obtained therein.

The casing 53 is formed with a tubular extension 58 to receive the end of a pipe 59 for supplying a charge of fuel under atmospheric pressure. The operation of the engine is the same as of the first described embodiment except that only air is compressed by the piston and forced into the explosive chamber 54.

It is obvious that the stud 57 may also be applied to the casing 29 to vary its content by adjustment of the stud.

The modification shown in Figs. 5 and 6 exemplifies the employment of a rotor 60 having a peripheral piston 61 and a piston 62 and 63 respectively secured to the rotor at the sides thereof.

Obviously, for each piston a separate set of gate valves, a separate explosion chamber, and other auxiliary parts are provided creating thereby an engine of triple power with a single rotor. The number of pistons may, of course, be increased or decreased.

While the drawings show certain embodiments of the invention, numerous changes and alterations may be made without departing from the spirit of the invention.

We, therefore, do not limit ourselves to details of construction and arrangement of parts, as shown, but want to include all changes, variations and modifications constituting departures within the scope of the invention as defined in the appended claims.

We claim:

1. A rotary engine, including an air intake, a rotor having a piston for compressing inducted air, an explosion chamber, means for normally dividing said explosion chamber in two compartments, one of said compartments being the compression chamber for the inducted air and both compartments when communicating constituting the explosion chamber, means for supplying a fuel charge under atmospheric pressure to the other of said compartments, and means for placing both compartments in communication at time of explosion.

2. A rotary engine, including a casing, an air intake for said casing, a rotor in said casing having a piston for compressing inducted air, an explosion chamber on said casing communicating with the casing chamber, means for normally dividing said explosion chamber in two compartments, one of said compartments being the compression chamber for the inducted air, and both compartments when intercommunicating constituting the explosion chamber, means for supplying a fuel charge under atmospheric pressure to the other of said compartments, and means for placing both compartments in inter-communication at time of explosion.

3. A rotary engine, including a casing, an air intake for said casing, a rotor in said casing having a piston for compressing inducted air, an explosion chamber on said casing communicating with the casing chamber, means for normally dividing said explosion chamber in two compartments, one of said compartments being the compression chamber for the inducted air, and both compartments when inter-communicating constituting the explosion chamber, means for supplying a fuel charge under atmospheric pressure to the other of said compartments, means for placing both compartments in inter-communication at time of explosion, and means for varying the cubic content of said explosion chamber in order to maintain the expansion constant upon variation of the amount of fuel admitted.

RAYMOND H. GOLD.
SIDNEY WASSERMAN.